(12) United States Patent
Mahani et al.

(10) Patent No.: US 11,340,841 B2
(45) Date of Patent: May 24, 2022

(54) RECOGNITION-BASED DATA ENTRY FOR PRODUCTION PRINT SYSTEM

(71) Applicants: Maryamossadat Nematollahi Mahani, Boulder, CO (US); Vlad Alin Iordachescu, Mosnita veche (RO)

(72) Inventors: Maryamossadat Nematollahi Mahani, Boulder, CO (US); Vlad Alin Iordachescu, Mosnita veche (RO)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/330,107

(22) Filed: May 25, 2021

(65) Prior Publication Data

US 2021/0311672 A1 Oct. 7, 2021

Related U.S. Application Data

(63) Continuation of application No. 16/837,271, filed on Apr. 1, 2020, now abandoned.

(51) Int. Cl.
*G06F 3/12* (2006.01)
*G06F 3/0482* (2013.01)

(52) U.S. Cl.
CPC .......... *G06F 3/1204* (2013.01); *G06F 3/0482* (2013.01); *G06F 3/1231* (2013.01); *G06F 3/1234* (2013.01); *G06F 3/1256* (2013.01); *G06F 3/1259* (2013.01)

(58) Field of Classification Search
None
See application file for complete search history.

(56) References Cited

U.S. PATENT DOCUMENTS

| 10,896,008 B2 * | 1/2021 | Tajima ................. G06F 3/1203 |
| 2017/0300272 A1 | 10/2017 | Kalloe et al. |
| 2019/0034130 A1 | 1/2019 | Tajima |

OTHER PUBLICATIONS

European Search Report; Application EP21165934; dated Jul. 30, 2021.

* cited by examiner

*Primary Examiner* — Paul F Payer
(74) *Attorney, Agent, or Firm* — Duft & Bornsen, PC

(57) ABSTRACT

Systems and methods are provided for visual timelines for printer management of a print system. One embodiment includes a printer terminal device that receives printer statuses of the first printer and the second printer, and displays a GUI that includes a first visual timeline of printer statuses at the first printer and a second visual timeline of printer statuses at the second printer. The GUI also includes a line at a location of user interaction, the line extending across the first visual timeline and the second visual timeline to indicate a historical point of time. The printer terminal device retrieves event data of one or more print jobs of the first printer and the second printer based on the historical point of time, and displays at the GUI the event data along with the line to visually indicate context for a user entering the description for the printer status.

20 Claims, 5 Drawing Sheets

RECOGNITION-BASED DATA ENTRY FOR PRODUCTION PRINT SYSTEM

RELATED APPLICATIONS

This document is a continuation of U.S. patent application Ser. No. 16/837,271 (filed on Apr. 1, 2020) titled, "RECOGNITION-BASED DATA ENTRY FOR PRODUCTION PRINT SYSTEM," which is hereby incorporated by reference.

FIELD

The disclosure relates to the field of printing, and in particular, to management and display of printer data.

BACKGROUND

Production printers, which can print hundreds of pages per minute, are typically managed by a print operator that performs many tasks to make sure print jobs are printed correctly and efficiently. In addition to their other duties, print operators may be tasked with recording details about various states of a printer to help print supervisors assess productivity. However, in an effort to finish their other primary tasks, print operators often write up logs of what happened at the end of the day, and the information may thus be prone to errors and approximations.

SUMMARY

Embodiments described herein provide for visual timelines for printer management of a print system. A printer terminal device manages multiple printers of a print shop, and for each printer displays a visual timeline of a status history of the printer. Multiple visual timelines are displayed on the screen of the printer terminal device. A user, or print operator, is able to interact with the visual timelines to enter additional data about a particular printer status. As the operator interacts with the visual timelines, the graphical user interface (GUI) displays a marker (e.g., line) of time across the multiple visual timelines so the operator can see what was occurring at each printer at a particular time. Additionally, the GUI conveniently displays additional data near the marker to help the operator remember what occurred at the printers near that time. This additional context helps the print operator remember details of what previously occurred as they enter printer status descriptions, thereby improving accuracy in data collection for the print shop to help print operators identify and correct inefficiencies in printing operations.

One embodiment is a system that includes a printer terminal device in communication with a first printer and a second printer and configured to receive printer statuses of the first printer and the second printer over a period of time. The printer terminal device is further configured to present a Graphical User Interface (GUI) at a display that includes a first visual timeline of printer statuses at the first printer and a second visual timeline of printer statuses at the second printer, the first visual timeline and the second visual timeline displayed as separate timelines that are aligned with respect to time. The printer terminal device is also configured to receive user interaction with a printer status displayed on one of the first visual timeline and the second visual timeline for entering a description for the printer status, and display at the GUI a line at a location of the user interaction, the line extending across the first visual timeline and the second visual timeline to indicate a historical point of time that corresponds with the location. The printer terminal device is further configured to retrieve event data of one or more print jobs of the first printer and the second printer based on the historical point of time, and displaying at the GUI the event data along with the line to visually indicate context for a user entering the description for the printer status.

A further embodiment is a method. The method includes receiving printer statuses of a first printer and a second printer over a period of time, and presenting a Graphical User Interface (GUI) at a display that includes a first visual timeline of printer statuses at the first printer and a second visual timeline of printer statuses at the second printer, the first visual timeline and the second visual timeline displayed as separate timelines that are aligned with respect to time. The method also includes receiving user interaction with a printer status displayed on one of the first visual timeline and the second visual timeline for entering a description for the printer status, and displaying, at the GUI, a line at a location of the user interaction, the line extending across the first visual timeline and the second visual timeline to indicate a historical point of time that corresponds with the location. The method further includes retrieving event data of one or more print jobs of the first printer and the second printer based on the historical point of time, and displaying, at the GUI, the event data along with the line to visually indicate context for a user entering the description for the printer status.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific example embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
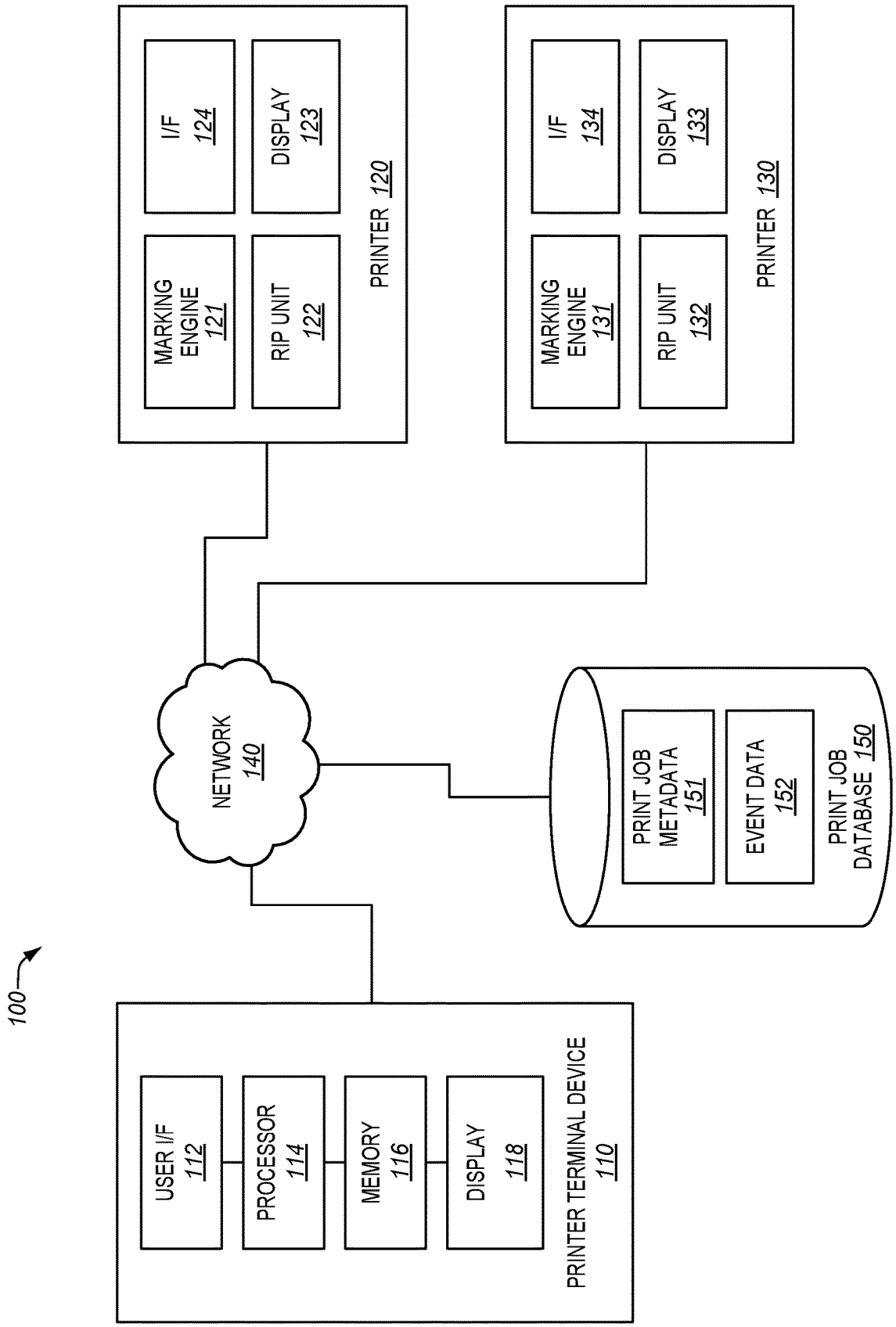
FIG. 1 is a block diagram of a print system in an illustrative embodiment.

FIG. 1 is a block diagram of a print system 100 in an illustrative embodiment. The print system 100 comprises any systems, devices, or components operable to print incoming print jobs. The print system 100 may be managed and monitored by a user, or print operator, interacting with a printer terminal device 110 in communication with printers 120 and 130 via a network 140. Generally, the printer terminal device 110 includes a display 118 to present one or more Graphical User Interfaces (GUIs) to the user, and utilizes user interface (I/F) 112 to receive user input pertaining to presented GUIs. For example, in some embodiments, the printer terminal device 110 comprises a tablet or similar device in which the display 118 and user I/F 112 are integrated in the form of a touch screen that the user may directly interact with. Alternatively or additionally, the user I/F 112 may comprise a keyboard, mouse, etc. for interacting with controls presented on such GUIs.

The printer terminal device 110 is enhanced to improve the accuracy of printer event data reported by a print operator by displaying multiple visual timelines of the multiple printers of the print system 100. The display of visual timelines is further enhanced with the display of a marker or line that connects the visual timelines with respect to time. The location of the marker directs the display of additional contextual information for the print operator to remember details to add that can improve the accuracy of collected data for the print system 100. Advantageously, print shops may use this improved data to help identify effective solutions for mitigating the expense of printer idling times.

Generally, the printer terminal device 110 manages user interactions to facilitate the handling of print jobs to be printed with the printers 120/130. The network 140 carries communications between the printer terminal device 110 and printers 120 and 130 based on user interactions with GUIs presented via display 118. The network 140 comprises any combination of devices and components for routing communications between the printer terminal device 110, print job database 150, and printers 120 and 130. For example, the network 140 may comprise the Internet, a local intranet, etc.

The printer terminal device 110 also communicates with a print job database 150 via the network 140. The print job database 150 stores data of previous print jobs that have been printed by the print system 100. In particular, the print job database 150 may store print job metadata 151, and the print job metadata 151 may be correlated with event data 152 to retrieve contextual cues for the print operator. As will be described in greater detail below, the printer terminal device 110 is enhanced to improve accuracy of the print job metadata 151 reported by the print operator, and further to use the event data 152 to generate useful prompts to the print operator via the display 118.

The printers 120 and 130 physically mark print media based on received print jobs. While only two printers are illustrated, in further embodiments any suitable number of printers may be managed by the printer terminal device 110. In this embodiment, printer 120 includes I/F 124 for exchanging data via the network 140. In response to receiving print data from the network 140, the printer 120 may engage in rasterization of the print data via Rasterization Image Processing (RIP) unit 122, which may include multiple Rasterization Image Processors. The rasterized print data may then be used to direct the operations of a marking engine 121 (e.g., an inkjet marking engine, laser print engine, etc.) in order to mark physical media. The printer 120 may also include a display 123. In some embodiments, functions and/or GUIs described with respect to the display 118 of the printer terminal device 110 may alternatively or additionally be implemented with the display 123 of the printer 120. The printer 130 includes similar elements to those of printer 120, such as marking engine 131, RIP unit 132, display 133, and I/F 134.

In one embodiment, the printer terminal device includes a processor 114 and memory 116. The processor 114 is operable to perform the functions of the printer terminal device 110, and may be implemented as custom circuitry, as a hardware processor executing programmed instructions stored in memory 116, etc. Memory 116 may also store instructions for one or more GUIs to users of the printer terminal device 110. Memory 116 may be implemented as a solid-state memory, spinning disk, etc. in order to electronically store data.

The printer terminal device 110, print job database 150, and printers 120/130 may include an Ethernet interface, Wi-Fi interface, etc. for engaging in communications with network 140. Although the printer terminal device 110 and print job database 150 are shown and described as separate, remote components, it will be appreciated that, in some embodiments, the print system 100 may implement cloud functionality in which processing/storage functions of the printer terminal device 110 and print job database 150 may be at least partially implemented in the other, or implemented remotely via other component(s) or sever(s) connected to the network 140. The particular arrangement, number, and configuration of components described herein are examples for purposes of discussion and are non-limiting.

Figure 2:
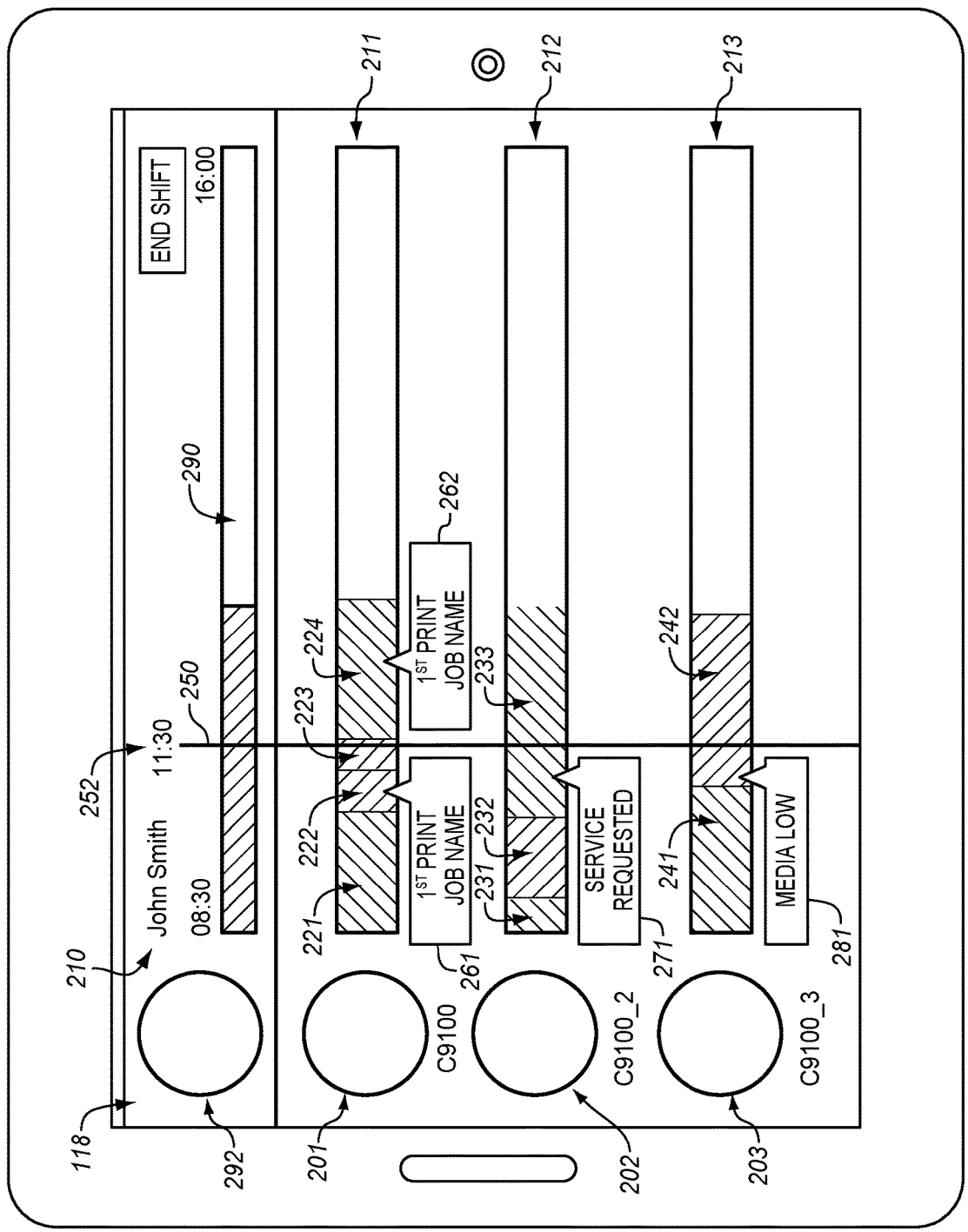
FIG. 2 shows a printer terminal device in an illustrative embodiment.

FIG. 2 shows a printer terminal device 110 in an illustrative embodiment. The printer terminal device 110 includes the display 118 to present one or more GUI(s) 210 displaying information of the print system 100. In particular, the GUI 210 includes visual timelines 211-213 for each of a plurality of printers of the print system 100. The visual timelines 211-213 are generally displayed as separate timelines that are aligned with respect to time. Each visual timeline 211-213 includes a series of printer statuses that adjoin along a single dimension to represent the status history of a printer over a period of time. For example, each visual timeline 211-213 may extend horizontally, with an adjacent visual timeline displayed above and/or below to align with respect to a horizontal dimension of time.

In this example, a first visual timeline 211 includes printer statuses 221-224 for a first printer 201, a second visual timeline 212 includes printer statuses 231-233 of a second printer 202, and a third visual timeline 213 includes printer statuses 241-242 for a third printer 203. Each visual timeline 211-213 displays the printer statuses in a manner that visually distinguishes changes to the type of printer status over time. For example, types of printer status may include printing states, idle states, and/or an error states. And, the visual timelines 211-213 may include a different visual representation for each of the printing state, the idle state, and the error state. For instance, in embodiments in which the different visual representation includes different colors, periods of normal printing may comprise green blocks/backgrounds, periods of idle times may comprise grey blocks/backgrounds, and periods of error states may comprise red blocks/backgrounds in the visual timeline.

Additionally, the visual timelines 211-213 may include control elements responsive to user interaction/selection.

For example, areas of printer statuses on each visual timeline which may be selectable via user touch or pointer device clicks. In response to user selection of a printer status, the printer terminal device 110 may generate additional user prompts and/or contextual information for entering additional information regarding printer statuses as further described below.

Suppose, for this example, that a print operator managing printers 201-203 via the printer terminal device 110 is interacting with the GUI 210 to enter additional data regarding an idle period (i.e., periods in which a printer is not printing despite being capable of printing or not having errors that prevent printing). Thus, the operator may select/touch an area of printer status 223 which, in this example, corresponds with an idle period of the first printer 201. In response, the printer terminal device 110 generates/displays a line 250 that extends across (e.g., in a vertical direction perpendicular to a horizontal dimension of time) one or more of the visual timelines 211-213. The line 250 may be displayed at a location of the user interaction and indicate a historical point of time 252 that corresponds with the location. In this example, the horizontal position of the line 250 indicates a time of 11:30.

Additionally, the printer terminal device 110 may retrieve event data of one or more print jobs based on the historical point of time 252. For example, the printer terminal device 110 may retrieve, from the print job database 150, event data 152 that occurred for each printer during a window of time near 11:30. This retrieved contextual information may be displayed alongside the line 250 to help the print operator recognize or remember what happened with respect to the printer status 223, thus making print shop data collection more accurate and reliable.

For example, with respect to the first printer 201, the printer terminal device 110 may display a first print job name 261 of a print job that printed before the historical point of time 252 (e.g., visually correlated with a prior printer status 222 that is green to indicate a period of printing). It may further display a second print job name 262 of another print job that printed after the historical point of time 252 (e.g., visually correlated with a prior printer status 224 that is green to indicate a period of printing). The first print job name 261 may be displayed to one side of the line 250, and the second print job name 262 may be displayed to another side of the line 250. Thus, the displayed event data may include metadata or other information of print jobs associated with printer status(es) adjacent to the printer status selected by the user.

Alternatively or additionally, the printer terminal device 110 may retrieve event data of other printers that may help provide context for the print operator. For example, with respect to the second printer 202, the printer terminal device 110 may retrieve/display an error description 271 of printer status 233 that coincided with the selected idle printer status 223 of the first printer 201. As another example, with respect to the third printer 203, the printer terminal device 110 may retrieve/display a warning message 281 received at the third printer 203 that occurred within a threshold period of time of the line 250.

The printer terminal device 110 may also receive an operator schedule for a print operator managing the printers, and display at the GUI 210 an operator timeline 290 aligned with the visual timelines 211-213 with respect to time. The line 250 may extend to/across the operator timeline 290 to help an operator 292 visualize their activity throughout the day with respect to time and remember the details of print statuses to record for improved data collection accuracy.

Figure 3:
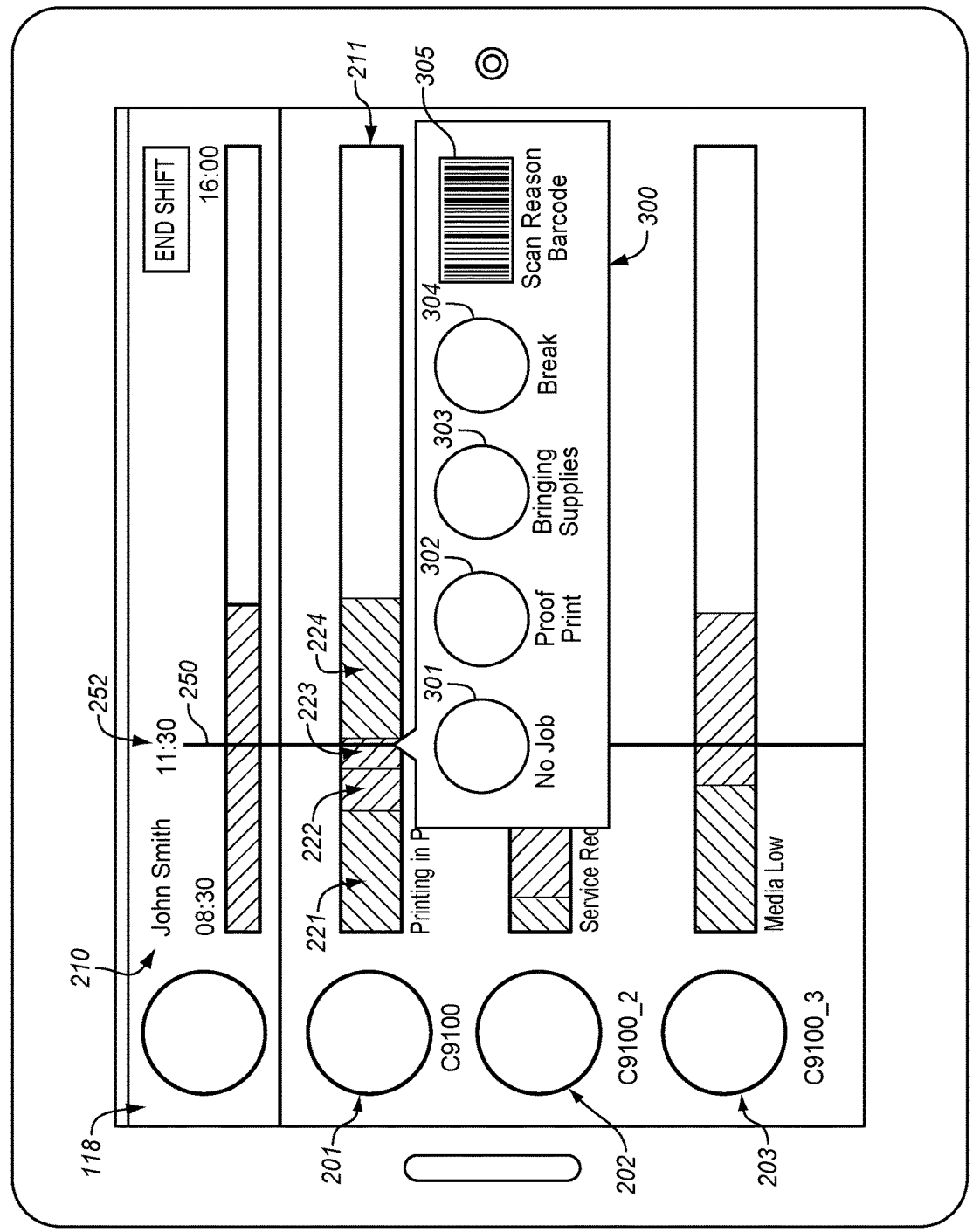
FIG. 3 shows a GUI displaying a prompt for user input in relation to a visual timeline in an illustrative embodiment.

FIG. 3 shows the GUI 210 displaying a prompt 300 for user input in relation to the visual timeline 211 in an illustrative embodiment. In continuing with the previous example, suppose that the print operator has selected the printer status 223 having a grey background to indicate an idle period. In addition to the line 250, the printer terminal device 110 may display the prompt 300 on the GUI 210. The prompt 300 may include a graphical window with potential reasons for the printer status as selectable options 301-305. For example, the operator may select the area of selectable option 303 to indicate that the idle period, or printer status 223, was due to fetching supplies for the printer. Using patterns of this type of information collected over time, a print shop may make informed decisions to improve print shop efficiency such as determining to relocate their supplies closer to the print area based on the number of user responses indicating fetching supplies as a factor for printer idling periods.

After the print operator has selected one of the selectable options 301-305, the prompt 300, line 250, and/or contextual information may be removed from display at the GUI 210. The selectable options 301-305 may alternatively or additionally include other control elements or actions to facilitate collecting operator data. For example, the selectable option 305 may trigger opening a camera application to capture an image of an error barcode printed by the printer in association with the printer status. The prompt 300 may additionally or alternatively include options to pop-up a window for typing input and/or to open a file explorer for browsing/attaching a file to the printer status. Further illustrative details of the printer terminal device 110, GUI 210, and visual timelines 211-213 are described below.

Figure 4:
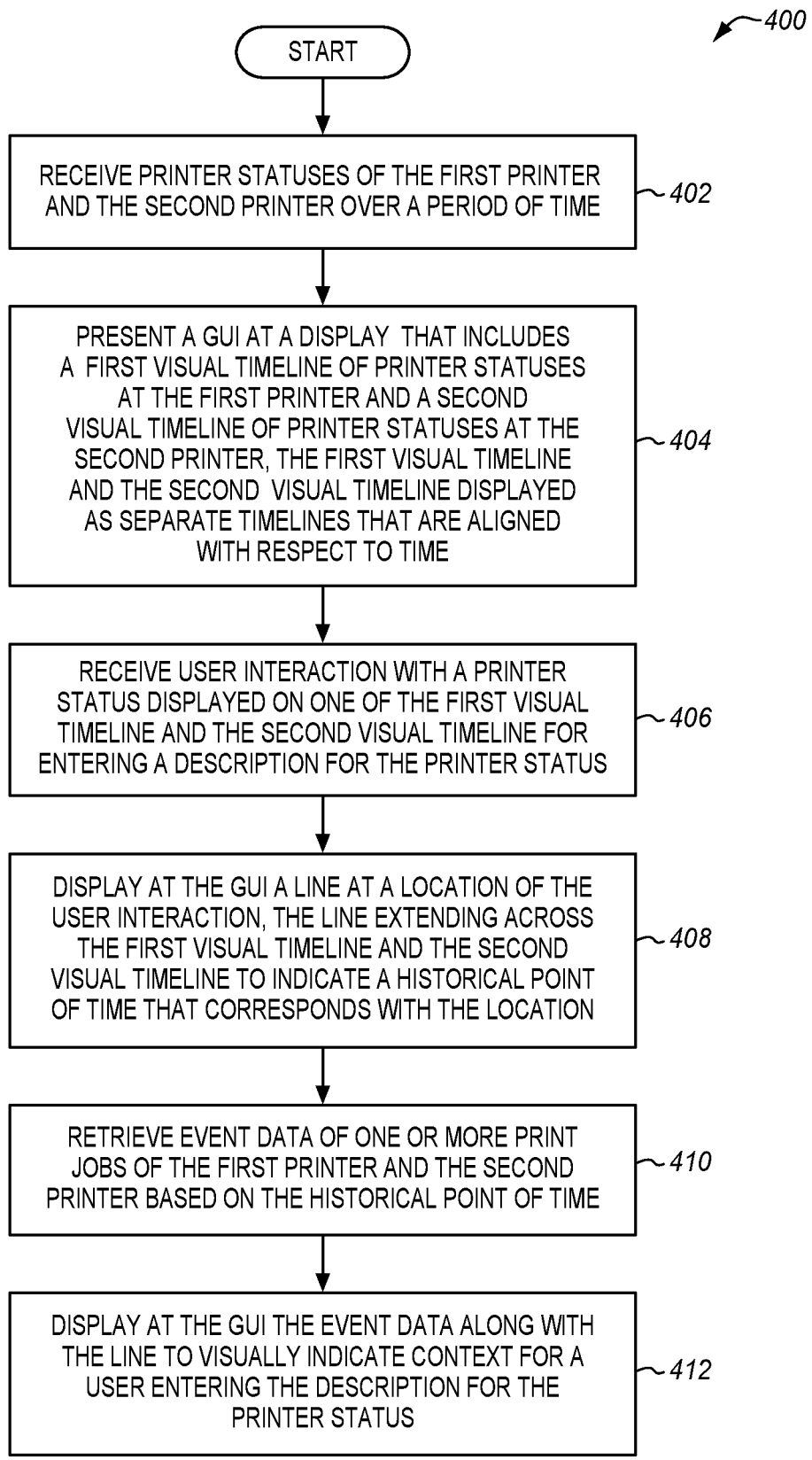
FIG. 4 is a flowchart illustrating a method of prompting data collection for a printing system in an illustrative embodiment.

FIG. 4 is a flowchart illustrating a method 400 of prompting data collection for a printing system in an illustrative embodiment. The steps of the method 400 are described with reference to the print system 100, the printer terminal device 110, and GUI 210 described above, but those skilled in the art will appreciate that the method 400 may be performed in other systems. The steps of the flowcharts described herein are not all inclusive, may include other steps not shown, and may be performed in an alternative order.

In step 402, the printer terminal device 110 receives printer statuses of at a first printer and a second printer over a period of time. In step 404, the printer terminal device 110 presents the GUI 210 at the display 118 that includes a first visual timeline of printer statuses at the first printer and a second visual timeline of printer statuses at the second printer. As earlier described, the first visual timeline and the second visual timeline may be displayed as separate timelines that are aligned with respect to time.

In step 406, the printer terminal device 110 receives user interaction with a printer status displayed on one of the first visual timeline and the second visual timeline for entering a description for the printer status. In step 408, the printer terminal device 110 displays at the GUI 210 a line at a location of the user interaction, the line extending across the first visual timeline and the second visual timeline to indicate a historical point of time that corresponds with the location.

In step 410, the printer terminal device 110 retrieves event data of one or more print jobs of the first printer and the second printer based on the historical point of time. And, in step 412, the printer terminal device 110 displays at the GUI 210 the event data along with the line to visually indicate context for a user entering the description for the printer status. Thus, in using the method 400, the print operator is visually prompted to enter printer status metadata for improved print shop data collection.

Figure 5:
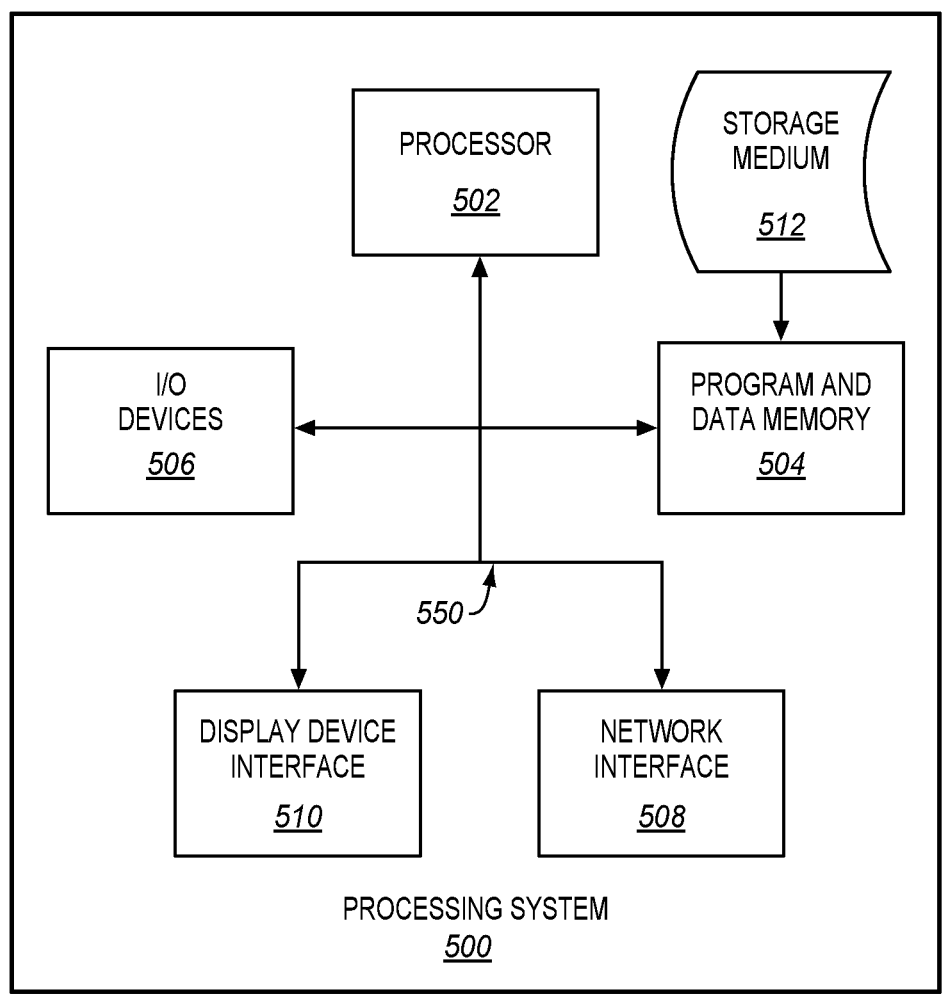
FIG. 5 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of printing system 100 to perform the various operations disclosed herein. FIG. 5 illustrates a processing system 500 operable to execute a computer readable medium embodying programmed instructions to perform desired functions in an exemplary embodiment. Processing system 500 is operable to perform the above operations by executing programmed instructions tangibly embodied on computer readable storage medium 512. In this regard, embodiments of the invention can take the form of a computer program accessible via computer-readable medium 512 providing program code for use by a computer or any other instruction execution system. For the purposes of this description, computer readable storage medium 512 can be anything that can contain or store the program for use by the computer.

Computer readable storage medium 512 can be an electronic, magnetic, optical, electromagnetic, infrared, or semiconductor device. Examples of computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 500, being suitable for storing and/or executing the program code, includes at least one processor 502 coupled to program and data memory 504 through a system bus 550. Program and data memory 504 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 506 (including but not limited to keyboards, displays, pointing devices, etc.) can be coupled either directly or through intervening I/O controllers. Network adapter interfaces 508 may also be integrated with the system to enable processing system 500 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 510 may be integrated with the system to interface to one or more display devices, such as printing systems and screens for presentation of data generated by processor 502.

Although specific embodiments were described herein, the scope of the invention is not limited to those specific embodiments. The scope of the invention is defined by the following claims and any equivalents thereof.

What is claimed is:

1. A system comprising:
a printer terminal device in communication with a first printer and a second printer and configured to receive printer statuses of the first printer and the second printer over a period of time,
the printer terminal device configured to present a Graphical User Interface (GUI) at a display that includes a first visual timeline of printer statuses at the first printer and a second visual timeline of printer statuses at the second printer, the first visual timeline and the second visual timeline displayed as separate timelines that are aligned with respect to time,
the printer terminal device configured to receive user interaction with a printer status displayed on one of the first visual timeline and the second visual timeline for entering a description for the printer status, and to display at the GUI a visual indicator at a location of the user interaction, the visual indicator operable to indicate a historical point of time of the first visual timeline and the second visual timeline, and
the printer terminal device configured to retrieve event data of one or more print jobs of the first printer and the second printer based on the historical point of time, and to display at the GUI the event data along with the visual indicator to visually indicate context for a user entering the description for the printer status.

2. The system of claim 1 wherein:
the visual indicator comprises a line extending across the first visual timeline and the second visual timeline to indicate the historical point of time.

3. The system of claim 2 wherein the printer terminal device is further configured to:
in response to receiving user input of the description of the printer status, remove display of the event data and the line.

4. The system of claim 2 wherein:
the printer status includes an idle state,
the event data includes a first name of a first print job that printed before the historical point of time, and a second name of a second print job that printed after the historical point of time, and
the first name of the first print job is displayed to one side of the line, and the second name of the second print job is displayed to another side of the line.

5. The system of claim 2 wherein:
the first visual timeline and the second visual timeline extend horizontally, and
the line extends vertically across the first visual timeline and the second visual timeline.

6. The system of claim 1 wherein:
each printer status indicates one of a printing state, an idle state, and an error state.

7. The system of claim 1 wherein the printer terminal device is further configured to:
receive an operator schedule for a print operator of the first printer and the second printer; and
display, at the GUI, an operator timeline aligned with the first visual timeline and the second visual timeline with respect to time.

8. A method comprising:
receiving printer statuses of a first printer and a second printer over a period of time,
presenting a Graphical User Interface (GUI) at a display that includes a first visual timeline of printer statuses at the first printer and a second visual timeline of printer statuses at the second printer, the first visual timeline and the second visual timeline displayed as separate timelines that are aligned with respect to time;
receiving user interaction with a printer status displayed on one of the first visual timeline and the second visual timeline for entering a description for the printer status;
displaying, at the GUI, a visual indicator at a location of the user interaction, the visual indicator operable to indicate a historical point of time of the first visual timeline and the second visual timeline;

retrieving event data of one or more print jobs of the first printer and the second printer based on the historical point of time; and displaying, at the GUI, the event data along with the visual indicator to visually indicate context for a user entering the description for the printer status.

9. The method of claim 8 wherein:

the visual indicator comprises a line extending across the first visual timeline and the second visual timeline to indicate the historical point of time.

10. The method of claim 9 further comprising:

in response to receiving user input of the description of the printer status, removing display of the event data and the line.

11. The method of claim 9 wherein:

the printer status includes an idle state, the event data includes a first name of a first print job that printed before the historical point of time, and a second name of a second print job that printed after the historical point of time, and the first name of the first print job is displayed to one side of the line, and the second name of the second print job is displayed to another side of the line.

12. The method of claim 9 wherein:

the first visual timeline and the second visual timeline extend horizontally, and the line extends vertically across the first visual timeline and the second visual timeline.

13. The method of claim 8 wherein:

each printer status indicates one of a printing state, an idle state, and an error state.

14. A non-transitory computer readable medium embodying programmed instructions which, when executed by a processor, are operable for performing a method comprising:

receiving printer statuses of a first printer and a second printer over a period of time, presenting a Graphical User Interface (GUI) at a display that includes a first visual timeline of printer statuses at the first printer and a second visual timeline of printer statuses at the second printer, the first visual timeline and the second visual timeline displayed as separate timelines that are aligned with respect to time;

receiving user interaction with a printer status displayed on one of the first visual timeline and the second visual timeline for entering a description for the printer status;

displaying, at the GUI, a visual indicator at a location of the user interaction, the visual indicator operable to indicate a historical point of time of the first visual timeline and the second visual timeline;

retrieving event data of one or more print jobs of the first printer and the second printer based on the historical point of time; and displaying, at the GUI, the event data along with the visual indicator to visually indicate context for a user entering the description for the printer status.

15. The medium of claim 14 wherein:

the visual indicator comprises a line extending across the first visual timeline and the second visual timeline to indicate the historical point of time.

16. The medium of claim 15 wherein the method further comprises:

in response to receiving user input of the description of the printer status, removing display of the event data and the line.

17. The medium of claim 15 wherein:

the printer status includes an idle state, the event data includes a first name of a first print job that printed before the historical point of time, and a second name of a second print job that printed after the historical point of time, and the first name of the first print job is displayed to one side of the line, and the second name of the second print job is displayed to another side of the line.

18. The medium of claim 15 wherein:

the first visual timeline and the second visual timeline extend horizontally, and the line extends vertically across the first visual timeline and the second visual timeline.

19. The medium of claim 14 wherein:

each printer status indicates one of a printing state, an idle state, and an error state.

20. The medium of claim 14 wherein the method further comprises:

receiving an operator schedule for a print operator of the first printer and the second printer;

displaying, at the GUI, an operator timeline aligned with the first visual timeline and the second visual timeline with respect to time.

* * * * *